(12) United States Patent
Bageshwar et al.

(10) Patent No.: US 9,507,020 B2
(45) Date of Patent: Nov. 29, 2016

(54) UNMANNED AIRCRAFT SYSTEMS SENSE AND AVOID SENSOR FUSION TRACK INITIALIZATION

(71) Applicant: Honeywell International Inc., Morristown, NJ (US)

(72) Inventors: Vibhor L. Bageshwar, Minneapolis, MN (US); Nuri Kundak, Brno (CZ); Milos Vesely, Nemcice (CZ)

(73) Assignee: Honeywell International Inc., Morris Plains, NJ (US)

( * ) Notice: Subject to any disclaimer, the term of this patent is extended or adjusted under 35 U.S.C. 154(b) by 385 days.

(21) Appl. No.: 14/097,456

(22) Filed: Dec. 5, 2013

(65) Prior Publication Data
US 2015/0160338 A1    Jun. 11, 2015

(51) Int. Cl.
| | |
|---|---|
| *G01S 13/72* | (2006.01) |
| *G01S 13/93* | (2006.01) |
| *G01S 7/282* | (2006.01) |
| *G01S 13/18* | (2006.01) |

(52) U.S. Cl.
CPC ............ *G01S 13/9303* (2013.01); *G01S 7/282* (2013.01); *G01S 13/72* (2013.01); *G01S 13/726* (2013.01); *G01S 13/18* (2013.01)

(58) Field of Classification Search
CPC ................. G01S 13/18; G01S 13/66–13/726; G01S 13/9303
USPC ........................................ 235/400; 342/94–97
See application file for complete search history.

(56) References Cited

U.S. PATENT DOCUMENTS

| | | | | |
|---|---|---|---|---|
| 5,396,252 A * | 3/1995 | Kelly | ...................... | G01S 13/72 342/160 |
| 5,400,264 A * | 3/1995 | Phillis | ................... | G01S 13/726 700/90 |
| 5,414,643 A * | 5/1995 | Blackman | ............. | G01S 13/726 342/95 |
| 5,422,830 A * | 6/1995 | Post | ...................... | G01S 13/723 348/169 |
| 5,842,156 A * | 11/1998 | Hong | ................... | G01S 13/726 342/104 |
| 6,239,740 B1 * | 5/2001 | Collins | ................... | G01S 15/66 342/109 |
| 6,243,037 B1 * | 6/2001 | Pulford | ................. | G01S 13/003 342/107 |
| 6,292,136 B1 * | 9/2001 | Egnell | ..................... | G01S 3/043 342/162 |
| 7,626,535 B2 * | 12/2009 | Ding | ..................... | G01S 13/726 342/90 |
| 7,737,878 B2 * | 6/2010 | van Tooren | ......... | G01S 13/9303 244/3.1 |
| 8,060,295 B2 * | 11/2011 | Estkowski | ............. | G05D 1/104 340/961 |
| 8,355,834 B2 * | 1/2013 | Duggan | ............... | G05D 1/0061 244/75.1 |
| 8,675,448 B1 * | 3/2014 | Wakayama | ............. | G01S 7/524 367/92 |
| 2004/0027274 A1 * | 2/2004 | Driessen | ............... | G01S 7/2923 342/91 |
| 2008/0027647 A1 * | 1/2008 | Ansell | ................... | G01S 13/723 701/301 |
| 2008/0111730 A1 * | 5/2008 | Ding | ..................... | G01S 13/726 342/90 |

(Continued)

OTHER PUBLICATIONS

European Patent Office, "Extended European Search Report for Application Serial No. 14192725.1", "from Foreign Counterpart to U.S. Appl. No. 14/097,456", May 4, 2015, pp. 18, Published in: EP.

(Continued)

*Primary Examiner* — Peter Bythrow
(74) *Attorney, Agent, or Firm* — Fogg & Powers LLC

(57) ABSTRACT

A method to initialize tracks from sensor measurements is provided. The method includes identifying at least one tentative track based on data collected from at least one sensor at three sequential times; initializing a confirm/delete track filter for the identified tentative tracks; and using gates computed from state vector statistics to one of: confirm the at least one tentative track; reprocess the at least one tentative track; or delete the at least one tentative track.

15 Claims, 5 Drawing Sheets

(56) References Cited

U.S. PATENT DOCUMENTS

| | | | |
|---|---|---|---|
| 2008/0111731 A1* | 5/2008 | Hubbard | G01S 13/5246 342/160 |
| 2010/0013697 A1* | 1/2010 | De Waard | G01S 13/878 342/59 |
| 2011/0118980 A1* | 5/2011 | Hoy | G05D 1/0202 701/301 |

OTHER PUBLICATIONS

Benavoli et al., "Knowledge-Based System for Multi-Target Tracking in a Littoral Environment", "IEEE Transactions on Aerospace and Electronic Systems", Jul. 1, 2006, pp. 1100-1119, vol. 42, No. 3, Publisher: IEEE, Published in: Piscataway, NJ.

Braca et al, "Application of the JPDA-UKF to HFSW Radars for Maritime Situational Awareness", "2012 15th INternational Conference on Information Fusion", Jul. 9, 2012, pp. 2585-2592, Publisher: IEEE.

Waard et al., "A Mean Track Approach Applied to the Multidimensional Assignment Problem", "IEEE Transactions on Aerospace and Electronics Systems", Apr. 1, 2007, pp. 450-471, vol. 43, No. 2, Publisher: IEEE, Published in: Piscataway, NJ, US.

Fasano et al., "Airborne Multisensor Tracking for Autonomous Collision Avoidance", "9th International Conference on Information Fusion", Jul. 10-13, 2006, pp. 17, Publisher: IEEE, Published in: IT.

Rousseau et al, "Multiple Sensor Tracking in a Sense & Avoid Context", "27th International Congress of the Aeronautical Sciences", 2010, pp. 1-10.

Temizer et al., "Collision Avoidance for Unmanned Aircraft using Markov Decision Processes", "AIAA Guidance, Navigation, and Control Conference", Aug. 2010, pp. 1-22, Publisher: American Institute of Aeronautics and Astronautics, Published in: CA.

European Patent Office, "Communication under Rule 71(3) EPC from European patent application No. 14192725.1", "from foreign counterpart of U.S. Appl. No. 14/097,456", Mar. 24, 2016, pp. 1-70, Published in: EP.

* cited by examiner

UNMANNED AIRCRAFT SYSTEMS SENSE AND AVOID SENSOR FUSION TRACK INITIALIZATION

BACKGROUND

The Federal Aviation Administration (FAA) has ruled that unmanned aircraft systems (UAS) (also referred to herein as remotely operated aircraft (ROA)) operating in the National Air Space (NAS) of the United States "must provide an equivalent level of safety, comparable to see-and-avoid (SAA) requirements for manned aircraft. The term see-and-avoid is used interchangeably with the term "sense-and-avoid (SAA)". The objective of SAA is to provide the UAS with the capability to perform self separation and collision avoidance maneuvers against all air traffic, with or without active, transponder based collision avoidance systems. Currently, no certified ROA SAA capability exists anywhere in the world. Remotely operated aircraft in operation in the NAS without SAA require Certificates of Authorization from the FAA and require chase planes (planes chasing the ROA), or ground based observers of the ROA.

The development of SAA capability for UAS has been identified by the FAA as one of the keys required to enable UAS to operate in the NAS. Non-military applications for these UAS include monitoring borders to locate illegal border activity, monitoring hazardous and potential fatal weather events, or monitoring traffic conditions.

Any use of UAS, regardless of manufacturer, in the NAS must follow rules and requirements established by the FAA. SAA requires the UAS to detect and track intruder aircraft in the operating vicinity of the ownship UAS to identify guidance maneuvers required to perform self separation and collision avoidance. The detect and track functions are key enablers for UAS SAA capability because the UAS cannot perform self separation or collision avoidance maneuvers for undetected, untracked intruder aircraft.

SUMMARY

The present application relates to a method to initialize tracks from sensor measurements. The method includes identifying at least one tentative track based on data collected from at least one sensor at three sequential times; initializing a confirm/delete track filter for the identified tentative tracks; and using gates computed from state vector statistics to one of: confirm the at least one tentative track; reprocess the at least one tentative track; or delete the at least one tentative track.

DRAWINGS

In accordance with common practice, the various described features are not drawn to scale but are drawn to emphasize features relevant to the present invention. Like reference characters denote like elements throughout figures and text.

DETAILED DESCRIPTION

Figure 1:
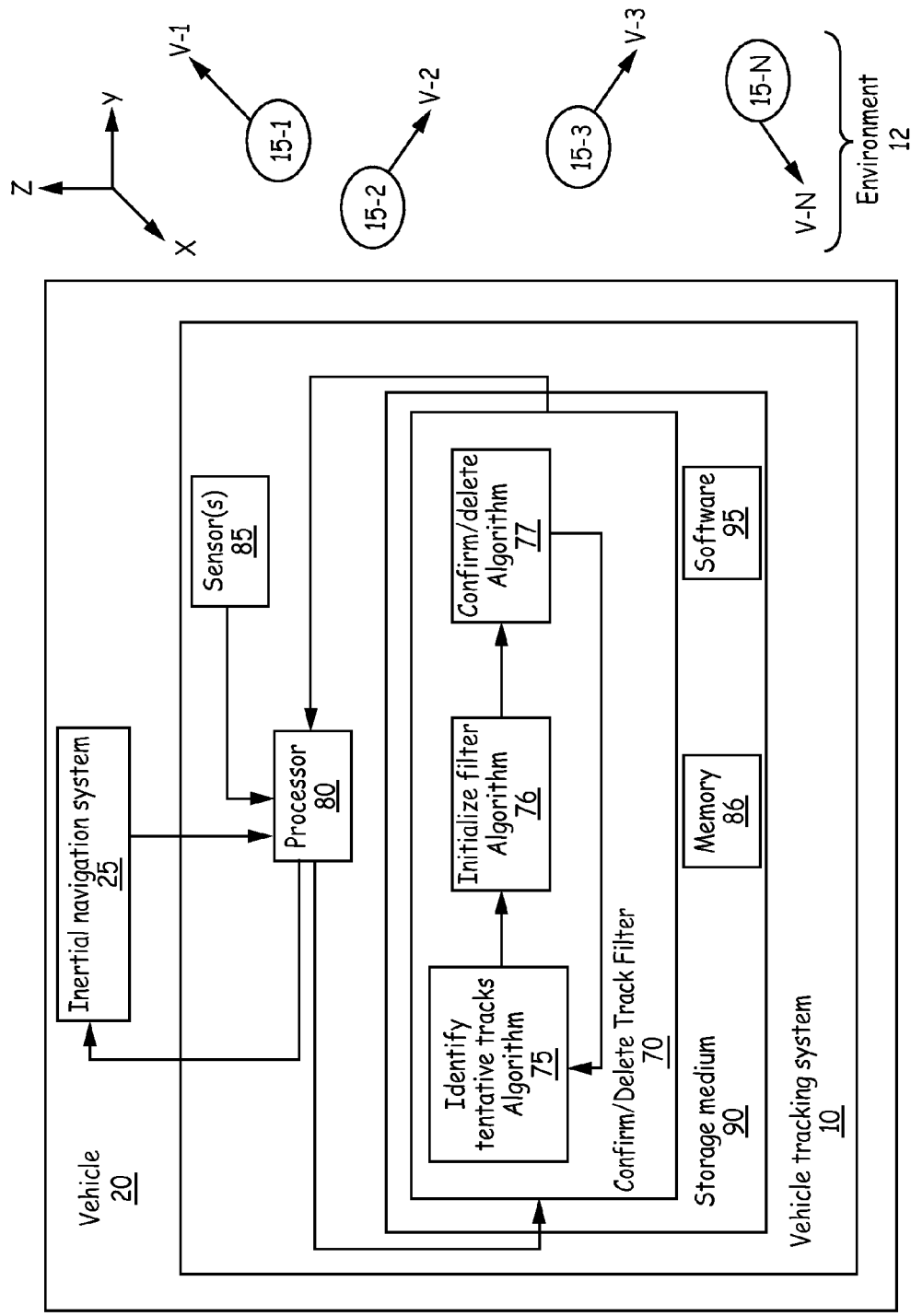
FIG. 1 is an embodiment of a vehicle tracking system in a vehicle to detect and track sensed objects in the environment of the vehicle.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Sense-and-avoid (SAA) requires an unmanned aircraft system (UAS) to detect and track intruder aircraft in the operating vicinity of the ownship UAS to identify guidance maneuvers required to perform self separation and collision avoidance. The terms "operating vicinity of the ownship" and the "environment of the ownship" are used interchangeably herein. SAA is also used to guide any vehicle operating on autopilot, regardless of the presence of a human in the vehicle. As defined herein the term the "ownship vehicle" is the vehicle housing the unmanned vehicle system that is tracking other vehicles in the vicinity of the ownship vehicle. In one implementation of this embodiment, the ownship vehicle is an ownship UAS. In another implementation of this embodiment, the ownship vehicle is an automobile operating in autopilot mode. The detect and track functions are key enablers for UAS SAA capability because the UAS cannot perform self separation or collision avoidance maneuvers for undetected, untracked intruder aircraft. The detect function refers to using surveillance sensors to measure the position of intruder aircraft relative to the ownship UAS. The track function refers to fusing the surveillance sensor measurements together to estimate the trajectory statistics (e.g., tracks) of the intruder aircraft relative to the ownship UAS.

The technology described herein uses surveillance sensors to provide measurements of intruder vehicles with corresponding measurement identifiers that can be correlated or random as a function of time. The terms "surveillance sensors" and "sensors" are used interchangeably herein. The term "measurement" as used herein is a measurement taken by a sensor to provide data about vehicles in the environment of the ownship vehicle. The track function: 1) estimates the tracks of the intruder aircraft using a data association algorithm to assign measurements to a current track, which includes both confirmed tracks and tentative tracks; 2) fuses assigned sensor measurements with the current estimates of the track using a filter; and 3) oversees the sensor fusion operation, confirms tracks, and deletes tracks at a trajectory manager. The track function initializes a new track for an intruder vehicle that enters the field of view of the sensors or initializes a new track for a previously undetected intruder vehicle within the field of view of the sensors. The technology described herein provides techniques to initialize a new track for an intruder vehicle (e.g., an intruder aircraft) to facilitate the track function. Explicit data association techniques, such as nearest neighbor or joint probabilistic data association (JPDA), do not have the capability of initializing new tracks.

The vehicle can be an aircraft, a water vehicle, or a land vehicle. Some described embodiments in this document describe an aircraft, however this not to be construed as a limitation of the technology. For example, this technology can be implemented in automobiles designed to drive themselves with little or no assistance from a driver in the automobile. In this latter case, the tracking vehicle system is a system in the automobile that drives on autopilot.

New tracks are initialized from a set of sensor measurements. There are two types of sensor measurements: 1) intruder vehicle or object originated sensor measurements; and 2) false measurements originating from clutter. For surveillance sensors that output identification (ID) with the sensor measurements, there are three types of sensor measurement ID classifications. A first ID classification is for cooperative sensor measurements. The cooperative sensor measurements include automatic dependent surveillance-broadcast (ADS-B) or traffic collision avoidance system (TCAS) Mode S with correlated track IDs. These types of sensors perform internal data association and output international civil aviation organization (ICAO) aircraft IDs that are consistent (i.e., correlated) across measurement times. A second ID classification is for non-cooperative sensor measurements with correlated track IDs. In this case, the sensor performs internal data association and outputs include unique aircraft IDs that are consistent (correlated) across measurement times. A third ID classification is for non-cooperative sensor measurements without correlated track IDs. Sensors within this classification are lower grade and inexpensive; the sensor outputs measurement identifiers that are not consistent (correlated) across measurement times.

The track initialization algorithm initializes new tracks using three major steps including: 1) identifying tentative tracks using a 3/3 measurement-to-measurement data association algorithm; 2) computing the trajectory statistics of the tentative tracks using three sequential sensor measurements; and 3) confirming or deleting tentative tracks for each sensor within the sensor measurement ID classifications. If a tentative track is identified from a sequence of measurements by the 3/3 data association algorithm, then a confirm/delete track filter is initialized for that tentative track and that track is considered as a possible track for a new vehicle in the environment of the ownship vehicle.

The algorithms described herein require three sequential measurements by at least one sensor to identify a tentative track. Since surveillance sensors provide false measurements that are modeled using a uniform distribution throughout the sensor's field of view, using three sequential measurements to initialize a track minimizes the number of tentative tracks identified from false measurements and minimizes the number of filters initialized for false tracks.

The algorithms described herein use the three sequential measurements of the tentative track in a least squares formulation to estimate the statistics for the three-dimensional (3D) position, velocity, and acceleration of the intruder vehicle relative to the ownship vehicle. These estimates of the track statistics provide a systematic approach to initializing the filters for tentative tracks and minimize the time required for the filters to converge.

The algorithms described herein use two alternative approaches of confirming tentative tracks using measurement-to-track association depending on whether the sensor measurement identifiers are correlated across time. In cases where the sensor measurement identifiers are correlated, the algorithm uses a combination of the IDs and the nearest neighbor approach to identify measurements associated to a tentative track. A track score is initialized at zero for each tentative track and subsequently updated as candidate measurements are associated to the track. The updated track score is compared to selected thresholds to confirm or delete the tentative track. The thresholds are selected by the designer of the algorithm for a given vehicle system.

The track scores are a cumulative total of scores computed with each assigned measurement. In one implementation of this embodiment, the track scores are a cumulative total of a limited number of scores computed for each assigned measurement or moving average. The score for each assigned measurement is a function of the chi-squared distance between a predicted measurement vector and an actual measurement vector. The designer has the option of selecting a minimum number of candidate measurements that are associated to a tentative track before the track is confirmed. Further, the designer also has the option of selecting the number of measurements used to accumulate the track score so that older measurements no longer contribute to the track score in favor of newer measurements.

In cases where the sensor measurement identifiers are not correlated, the algorithm uses JPDA to associate candidate measurements to a tentative track because sensor measurement identifiers do not indicate potential associations. JPDA allows for the possibility of multiple candidate measurements assigned to a tentative track. The track score is initialized at zero for each tentative track and subsequently updated as candidate measurements are associated to the track. If multiple candidate measurements are assigned to a tentative track, then an average track score is computed from the multiple measurements and the average track score is used to update the current track score.

FIG. 1 is an embodiment of a vehicle tracking system 10 in a vehicle 20 to detect and track sensed objects 15(1-N) in the environment 12 of the vehicle 20, where N is a positive integer. In one implementation of this embodiment, the vehicle 20 is an unmanned vehicle 20. The sensed objects 15(1-N) are moving with respective velocities V(1-N). The vehicle 20 includes an inertial navigation system 25 and the vehicle tracking system 10. The vehicle tracking system 10 includes at least one sensor 85, at least one processor 80, and storage medium 90 that includes at least one confirm/delete track filter 70, a memory 86, and software 95. The at least one confirm/delete track filter 70 is also referred to herein as track filter 70.

The sensors 85 are communicatively coupled to output data to the processor 80. The sensors 85 are operable to sense the objects 15(1-N) in the environment 12 of the vehicle 20. The sensors 85 can be any one of currently available or future developed sensors capable of sensing objects 15(1-N). For example, the sensors 85 can be sensitive to radiation in at least a portion of the radiation spectrum from x-rays to radio frequencies. Radar-based sensors and/or GNSS-based sensors are two key sensor technologies for the technology described herein. The sensors 85 can also be acoustic or vibration sensors.

The inertial navigation system 25 is communicatively coupled to output navigation solutions to the processor 80 and to receive input from the processor 80. The track filter 70 is communicatively coupled to receive input from the processor 80 and to output data to the processor 80. The processor 80 is also configured to execute the software 95 as required.

The track filter 70 includes an identify tentative tracks algorithm 75, an initialize filter algorithm 76, and a confirm/delete algorithm 77, which are described in detail below. The identify tentative tracks algorithm 75, the initialize filter algorithm 76, and the confirm/delete algorithm 77 together form the track initialization algorithm 75-77.

Figure 2:
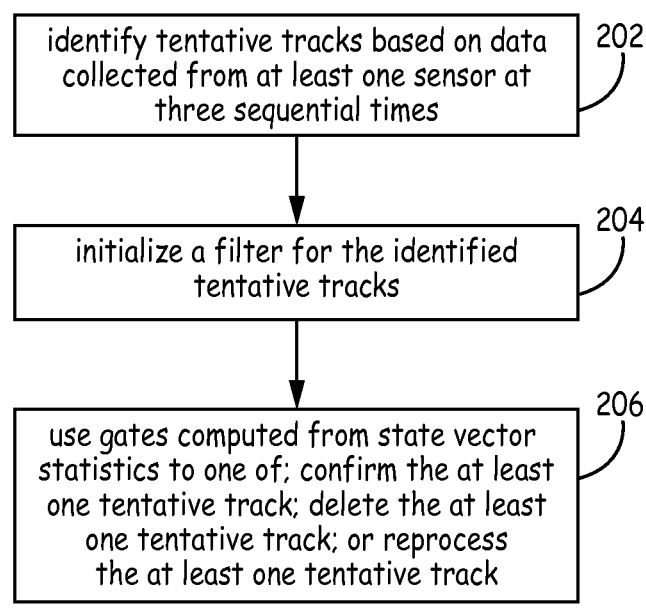
FIG. 2 is a flow diagram of an embodiment of a process to confirm or delete a tentative track.

FIG. 2 is a flow diagram of an embodiment of a method 200 to confirm or delete a tentative track. The method 200 is implemented by an execution of the track filter 70 by the processor 80 (FIG. 1).

At block 202, at least one tentative track is identified based on measurement data collected from at least one sensor 85 at three sequential measurement times. The processor 80 executes the identify tentative tracks algorithm 75 in the track filter 70 at block 202. The objective of identifying tentative tracks is accomplished by identifying measurement sequences that could originate from an intruder vehicle (e.g., sensed objects 15-1 through 15-N shown in FIG. 1). Tentative tracks are formulated using a sequence of measurements. As described herein, a 3/3 data association algorithm is used to identify tentative tracks. The 3/3 data association algorithm uses spherical gates, based on relative vehicle dynamic constraints, and three sequential sensor measurements to identify tentative tracks. This process is described in more detail below with reference to block 308 of FIG. 3.

At block 204, a filter is initialized for the identified tentative track. The processor 80 executes the initialize filter algorithm 76 in the track filter 70 at block 204 to initialize the identified tentative tracks. The filter is initialized by computing state vector statistics at the initial time ($t_0$) by performing a least squares analysis on a sequence of measurements and statistics associated with the sequence of measurements. In one implementation of this embodiment, the filter is initialized by computing the statistics of an initial state vector for the intruder vehicle using observation sequences of three measurements. The statistics of the initial state vector includes: position mean vector; velocity mean vector; acceleration mean vector; variance of position vector; variance of velocity vector; and variance of acceleration vector. A least squares analysis is performed on the three sequential associated measurements and the statistics associated with the three sequential associated measurements. The filter is only initialized for potential tracks that are not resultant from false measurements originating from clutter. A typical surveillance sensor measures and outputs approximately thirty tracks at a measurement time. Since initializing a filter for tentative tracks requires a large amount of computation time, the 3/3 data association algorithm only allows a filter to be initialized for potential tracks that are likely to be associated with intruder vehicles.

At block 206, gates are used to one of: confirm the at least one tentative track; reprocess the at least one tentative track; or delete the at least one tentative track. The gates are computed from state vector statistics.

Figure 3:
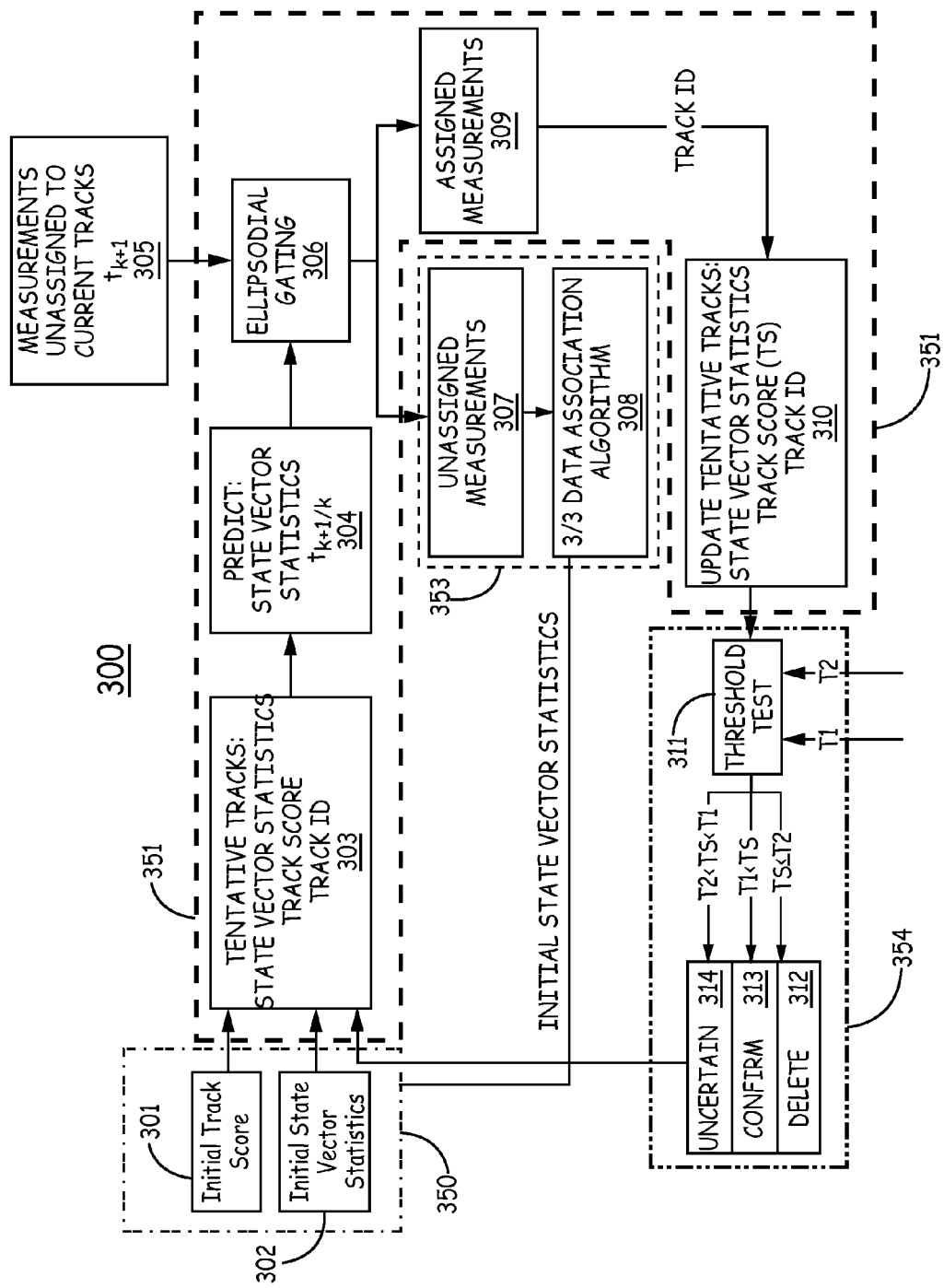
FIG. 3 is a flow diagram for an embodiment of a method to initialize a track from sensor measurements.

FIG. 3 is a flow diagram for an embodiment of a method 300 to initialize a track from sensor measurements. The data received from the at least one sensor 85 is processed by the processor 80 executing the track filter 70 to initialize a track in four steps as follows: 1) at least one tentative track is identified (block 353); 2) a filter is initialized for the identified tentative track (block 350); 3) the at least one tentative track is predicted and updated using the filter and sensor measurements (block 351), and 4) the tentative track is confirmed, deleted, or maintained (i.e., reprocessed) within tentative track status (block 354). A confirmed tentative track is an initialized new track that can be implemented by a tracking system.

The function of block 350 is to initialize a filter. Block 350 includes blocks 301 and 302. At block 301, an initial track score is input to the block 303. A track score, represented generally as TS in FIG. 3, is initialized for each tentative track. The track score is updated following filter measurement update at block 310. The processor 80 executes the initialize filter algorithm 76 in the at least one track filter 70 shown in FIG. 1 to implement block 350. In one implementation of this embodiment, the initial track score is a user selected value that is stored in memory 86. In another implementation of this embodiment, the initial track score is initialized at zero for each tentative track and is subsequently updated as candidate measurements are associated to the tentative track. At block 302, the initial state vector statistics are input to the block 303. The initial state vector statistics are generated during the identification of the tentative tracks, as described with reference to block 353 below. The measurements at three sequential measurement times $t_0$, $t_1$ and $t_2$ are input from the sensors 85 to the processor 80 and the processor 80 sends the data to the track filter 70. The statistics of the state vector are estimated using the three sequential measurements to initialize the tracking filter at time $t_2$. The three sequential measurements are selected by the 3/3 data association algorithm 308.

Once the filter is initialized for each tentative track, the flow proceeds to block 351. Block 351 includes blocks 303, 304, 306, 309, and 310. At block 351, the tentative tracks are predicted and updated. The at least one confirm/delete track filter 70 uses the state vector statistics from block 304 and measurements from block 305 to associate measurements to tentative tracks. Specifically, at block 304 of block 351, the processor 80 executes the at least one confirm/delete algorithm 77 in the track filter 70 to compute the predicted measurement vector and the innovation covariance matrix. The predicted state vector statistics include the computed predicted measurement vector and the innovation covariance matrix, which are represented mathematically as $z_{k+1/k}$, $S_{k+1}$.

If the measurement and tentative track fail the ellipsoid gate test at block 306, then the flow proceeds to block 353 from block 306. If the measurement and tentative track pass the ellipsoid gate test at block 306, then the flow proceeds to blocks 309, 310, and 311. When a sensor measurement passes the ellipsoidal gating test, that sensor measurement is assigned to a tentative track. The method proceeds from block 311 to one blocks 312, 313, or 314 based on the outcome of a threshold test as described below.

At block 303, the initial state vector statistics for a tentative track, the track ID, and the track score are output to block 304. In one implementation of this embodiment, at least one of the sensed objects 15(1-N) is sensed by the sensors 85 to include cooperative sensor measurements with ICAO IDs. In another implementation of this embodiment, at least one of the sensed objects 15(1-N) is sensed by the sensors 85 to include non-cooperative sensor measurements with unique correlated IDs. In yet another implementation of this embodiment, at least one of the sensed objects 15(1-N) is sensed by the sensors 85 to include non-cooperative sensor measurements with random IDs. In this latter case, a unique filter ID is assigned to the tentative track at block 303.

At block 304, the initial state vector statistics for a tentative track, the track ID, and the track score input from block 303 are used to predict the state vector statistics at a third time $t_3$ by propagating the state vector statistics at the second time $t_2$ to the third time $t_3$. The flow in block 351 of method 300 proceeds from block 304 to block 306.

At block 306, ellipsoidal gates are used to identify candidate measurement to tentative track associations. The ellipsoidal gates are computed using the predicted state vector statistics computed in block 304 and using measurements unassigned to current tracks that are input to block 306 from block 305. The ellipsoidal gates are formulated about predicted measurement vectors to identify candidate measurements for measurement-to-track association. First, the statistical distance between all gated measurements and predicted measurement vectors are computed. A gated measurement is a candidate measurement for a measurement-to-track association. This is described mathematically as:

$$d_{j,i}(k), \forall j=1,\ldots,J; \forall i=1,\ldots,m$$

J≡number of tentative tracks
m≡number of gated measurements

The term $d_{j,i}$ is the distance between gated measurement i and tentative track prediction j. In one implementation of this embodiment, the volume of the gate (prediction window) is selected so that there is probability $P_G \sim 1$ that a measurement corresponding to the intruder aircraft falls within the gate of the $i^{th}$ intruder aircraft 15-i, where i is a positive integer.

The measurements obtained at later times (e.g., at a fourth time $t_4$ and a fifth time $t_5$) are also associated to the tentative track at block 306. There are three possible outcomes at block 306.

In one outcome of block 306, the sensor ID association and ellipsoidal gating test associate a measurement vector (predicted at block 304 and measured at block 305) to the same tentative track. If the measurement is within the ellipsoidal gate for the tentative track with corresponding track ID, then the flow proceeds to block 309. At block 309, the measurement is assigned to the tentative track. If the sensor measurement is from a cooperative sensor or non-cooperative sensor with correlated track IDs, then the global nearest neighbor algorithm is used to assign a candidate measurement to a tentative track. The performance index is minimized to identify the measurements associated with a candidate track. This is described mathematically as:

$$\min_{i,j} \sum_{j=1}^{J} \sum_{i=1}^{m} d_{j,i}(k).$$

If the sensor measurement is from a non-cooperative sensor with a random track ID, then the JPDA algorithm is used to assign candidate measurements to a tentative track. Then the flow proceeds to block 310 to update the statistics and track score of the tentative track. At block 310, the processor 80 executes at least one confirm/delete algorithm 77 (FIG. 1) to update the state vector statistics and track score.

In another outcome of block 306, the sensor ID association and the ellipsoidal gating test do not associate a measurement vector (block 305) to a tentative track. In this case, the track score and the state vector statistics are not updated and the flow of method 300 proceeds from block 306 to block 307 in the block 353.

In yet another outcome of block 306, the sensor ID association and ellipsoidal gating test do not assign a measurement vector (block 305) to the same tentative track. If the measurement vector is not within the ellipsoidal gate for the tentative track with corresponding track ID, then the measurement is not assigned to the tentative track and the flow of method 300 proceeds from block 306 to block 307 in the block 353. There are two flows from block 306 as follows: 1) the measurement is not assigned to any tentative track and the process flows to 307 in block 353; or 2) the tentative track is updated and the process flows to block 311 in block 354 via blocks 309 and 310.

The process implemented at block 310 is now described. It is to be noted that each tentative track can have multiple gated measurement vectors so a gated measurement vector can be assigned to multiple tracks. This is due to the fact that measurement vectors are a combination of intruder vehicle originated measurements and false measurements or the intruder vehicles are close together. The block 310 includes two steps. First, a measurement update is used to update the state vector statistics corresponding to the tentative track.

Then an average track score for all gated measurements is used to update the track score for the tentative track. A chi-squared ($\chi^2$) technique is used to update the track score as follows:

$$d_{j,i;k+1}(z_{i;k+1} - z_{j;k+1/k})^T (S_{j,i;k+1})^{-1}(z_{i;k+1} - z_{j;k+1/k})$$

$$c(k+1) = 1 - \text{chi2cdf}(d_{j,i;k+1}, p)$$

In the above equations, p equals the dimension of measurement vector, where $p \in M^{p \times 1}$; chi2cfd(x, dim) equals the chi-squared cumulative distribution of x with dimension dim; and c(k) equals the track score at time k.

The $\chi^2$ track score is a number between 1 and 0, where 1 indicates confidence that the tentative track corresponds to an intruder vehicle. The track score is defined as follows:

$$TS_j(N_M) = \frac{1}{N_M - 2} \sum_{k=3}^{N_M} c_j(k)$$

$N_M \equiv$ measurement times $j \equiv$ intruder vehicle track number

Once the state vector statistics and track score for the tentative track are updated at block 310, the flow proceeds to block 354. Block 354 includes blocks 311-314. At block 311, the threshold test is performed on the tentative track. The threshold test is based on two user defined threshold values: first threshold T1; and second threshold T2. In one implementation of this embodiment, the first threshold T1 and second threshold T2 are stored in memory 86. The track scores TS that were updated at block 310 are compared to the first threshold T1 and second threshold T2 for track confirmation. The first threshold T1 is set to be greater than the second threshold T2.

When the track score TS is greater than the first threshold T1, the flow proceeds from block 311 to block 313, and the tentative track is confirmed as a track. When the track score TS is less than the first threshold T1 and greater than the second threshold T2, the flow proceeds from block 311 to block 314 and it is not certain (inconclusive) that the tentative track is a confirmed track. In this case, the track score TS and the state vector statistics for the uncertain track are output to block 303 and the tentative track is reprocessed. When the track score TS is less than the second threshold T2, the flow proceeds from block 311 to block 312 and the tentative track is deleted, since the measurements can not maintain the tentative track.

The process of block 353 is now described with reference to FIGS. 4 and 5. Block 353 includes blocks 307 and 308. As described above, the flow of method 300 proceeds to block 307 from block 306 when the candidate measurement is not associated with a tentative track. Block 353 identifies potential tentative tracks when a measurement from a sensor 85 is not assigned to an already identified track or tentative track. There are three possible reasons that a sensor measurement is not assigned to an already identified track or tentative track. In a first case, the data from the sensor 85 is a result of false measurements. In a second case, the data from the sensor 85 is indicative of a sensor measurement from a sensed object 15 in the environment 12 (FIG. 1) that is being sensed for the first time. In a third case, the data from the sensor 85 is indicative of a sensor measurement from an object that had previously been sensed and then subsequently was not sensed for a period of time before being sensed again.

At block 307, the candidate measurement that is not associated with a tentative track is identified as an unassigned measurement. At block 308, the processor 80 executes identify tentative tracks algorithm 75 in the confirm/delete track filter 70. Specifically, a 3/3 measurement-to-measurement data association algorithm is implemented to identify tentative tracks at block 308.

Figure 4:
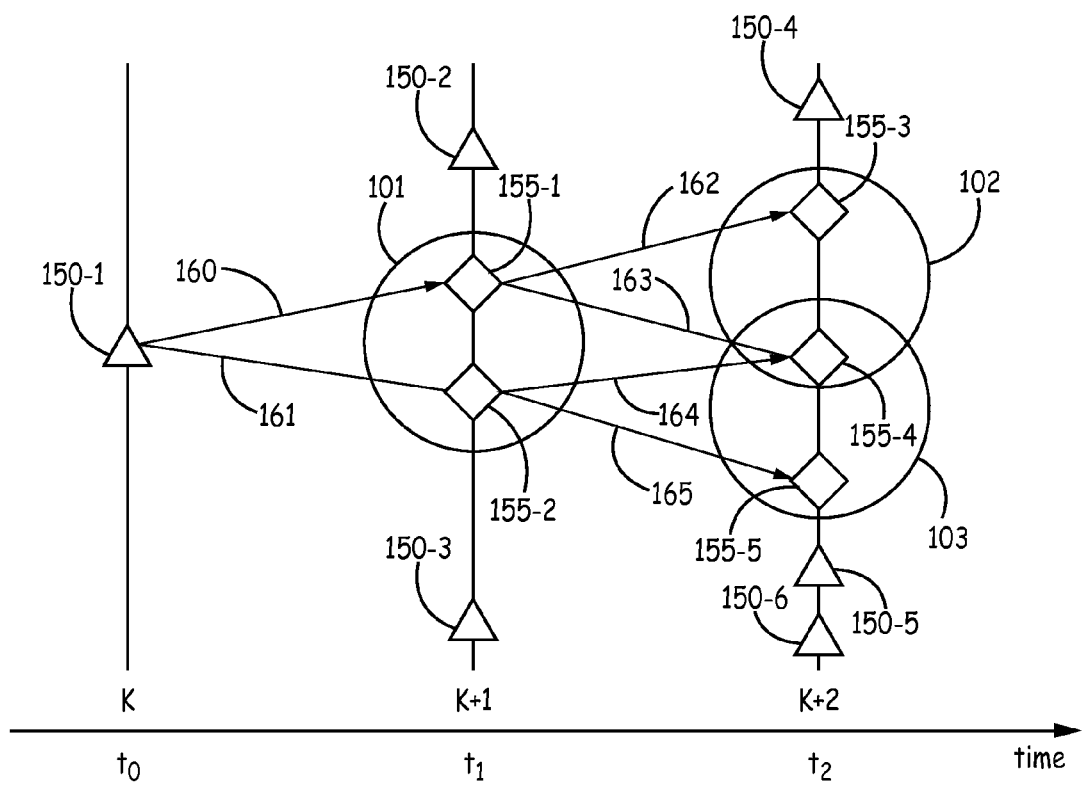
FIG. 4 is a diagram indicative of an exemplary use of spherical gates to perform 3/3 measurement-to-measurement data associations.

FIG. 4 is a diagram indicative of an exemplary use of spherical gates 101-103 to perform 3/3 measurement-to-measurement data associations. FIG. 5 is an expanded flow diagram 500 of an embodiment of an implementation of a 3/3 measurement-to-measurement data association algorithm 308 shown in FIG. 3. The flow diagram 500 outlines how the data from 3/3 measurement-to-measurement data association algorithm 308 are used to extract the initial state vector and the initial state covariance in block 350. The 3/3 measurement-to-measurement data association is implemented as follows. The sensor measurements available at an arbitrary time are classified into two groups: 1) measurements that are associated with intruder vehicles currently tracked); and 2) measurements that are not associated to intruder vehicles currently being tracked (e.g., a new vehicle in view of the sensors is to be tracked). For the former group, when measurements are associated with intruder vehicles that are currently being tracked, no track initialization is required. For the latter group, when a new vehicle is to be tracked track initialization is implemented. In this case, spherical gates are used to perform measurement-to-measurement data associations on sequential measurements at consecutive measurement times to identify potential tentative tracks.

Specifically, when there are non-cooperative sensor measurements without correlated track IDs, the system 10 forms a gate or prediction window (represented generally at 101, 102, and 103 in FIG. 4). There are multiple approaches to selecting a gate. Each gate 101, 102, or 103 (also referred to herein as "spherical gate 101, 102, or 103") includes a region that predicts where the measurement vector of an intruder vehicle at a subsequent measurement time is expected. The gating process uses either the ungated initial measurement vector or subsequent gated measurement vector to identify the next measurement vector that is part of the 3 gated measurement vector sequence.

As shown in FIG. 4, the distance between vectors compared to a gate threshold is used to identify measurement-to-measurement association candidates. The use of gates advantageously limits the computation burden of data associations by reducing the search space and the number of data association combinations. Also, the use of gates advantageously identifies those measurements that do not correspond to a current track or tentative track. However, gated measurements are not guaranteed to originate from one specific intruder vehicle, since prediction windows can overlap or the sensor can output false measurements. Thus, gated measurements still have association uncertainty. To account for this, each measurement sequence is statistically assigned a gated measurement.

A threshold of a spherical gate is the radius of the region formed about the measurement vector. The gate threshold is a function of the maximum relative velocity between the intruder vehicle and the ownship vehicle and is calculated, in part, based on measurement statistics. In one implementation of this embodiment, the gate threshold is defined by the user (i.e., a user defined threshold). Initially gating criteria for a measurement vector at time $t_1$ is obtained as follows. The identities of unassociated measurement vectors at an initial time $t_0$ are obtained. Then the distance between measurement vectors at times $t_0$ and $t_1$ are computed. The distance between measurement vectors is compared to the gate threshold to identify measurement-to-measurement associations. These functions are described mathematically as follows:

$$|z_i(t_1) - z_j(t_0)| \leq v_{max}T + \kappa S$$

$$|z_i(t_1) - z_j(t_0)| \equiv \text{distance between measurement vectors}$$

$$v_{max}T + \kappa S \equiv \text{gate threshold,}$$

where
$v_{max}$ = maximum relative speed = user defined
T = time between the previous two measurements = $t_1 - t_0$
S = position standard deviation
$\kappa$ = tuning parameter user defined
$z_i(t_1) - z_j(t_0) \equiv$ distance vector $\forall i=1, \ldots, j=1, \ldots, N$
N = number of measurements at time $t_0$
M = number of measurements at time $t_1$ In one implementation of this embodiment, the measurement-to-measurement association is done using only two consecutive measurements, however the tentative tracks can be formulated using false measurements and there is a high computational burden to initialize the filter for a large number of false tracks. In another implementation of this embodiment, the measurement-to-measurement association is done using four consecutive measurements. In this case a 4/4 measurement-to-measurement data association algorithm is implemented as is understandable to one skilled in the art.

The circular gates 101-103 shown in FIG. 4 are two-dimensional representations of a three-dimensional spherical gate. At an initial time $t_0$, represented generally at K, an unassociated measurement 150-1 is made by at least one sensor 85. As defined herein, an unassociated measurement is a measurement obtained by a sensor 85 that is not associated with any known measurement track sequence. At a first time $t_1$, represented generally at K+1, two unassociated measurements 150-2 and 150-3 are made by at least one sensor 85 and two associated measurements 155-1 and 155-2 are made by at least one sensor 85. As defined herein, an associated measurement is associated with a known measurement track sequence. As shown in the exemplary diagram of FIG. 4, the associated measurement 155-1 and 155-2 are within the spherical gate 101 for the previously unassociated measurement 150-1. Since the associated measurement 155-1 and 155-2 are within the spherical gate 101 of measurement 150-1, they are associated with the measurement 150-1. The associated measurement 155-1 is associated with the measurement 150-1 by the tentative measurement track sequence 160 and the associated measurement 155-2 is associated with the measurement 150-1 by the tentative measurement track sequence 161.

At a second time $t_2$, represented generally at K+2, three unassociated measurements 150-4, 150-5, and 150-6 are made by at least one sensor 85 and three associated measurements 155-3, 155-4, and 155-5 are made by at least one sensor 85. As shown in the exemplary diagram of FIG. 4, the associated measurements 155-3 and 155-4 are within the spherical gate 102 for the measurement 155-1. Since the measurements 155-3 and 155-4 are within the spherical gate 102 for the measurement 155-1, they are associated with the measurement 155-1. In this manner, measurements that lie within the spherical gate of associated measurements from the first time $t_1$ are identified at the second time $t_2$.

As shown in the exemplary diagram of FIG. 4, the measurements 155-4 and 155-5 are within the spherical gate 103 for the measurement 155-2. Since the measurements 155-4 and 155-5 are within the spherical gate 103 for the measurement 155-2, they are associated with the measurement 155-2. The associated measurement 155-4 is associated with both of the measurements 155-1 and 155-2 taken at the first time $t_1$, since the associated measurement 155-4 is within an overlapping region of the spherical gates 102 and 103.

As shown in the exemplary diagram of FIG. 4, the associated measurement 155-3 is associated with the measurements 150-1 and 155-1 by the tentative measurement track sequence 160 and 162, which together form a single tentative track. Likewise, the associated measurement 155-5 is associated with the measurements 150-1 and 155-2 by the tentative measurement track sequence 161 and 165, which together form a single tentative track. The associated measurement 155-4 is associated with the measurements 150-1 and 155-1 by the tentative measurement track sequence 160 and 163, and the associated measurement 155-4 is also associated with the measurements 150-1 and 155-2 by the tentative measurement track sequence 161 and 164.

Figure 5:
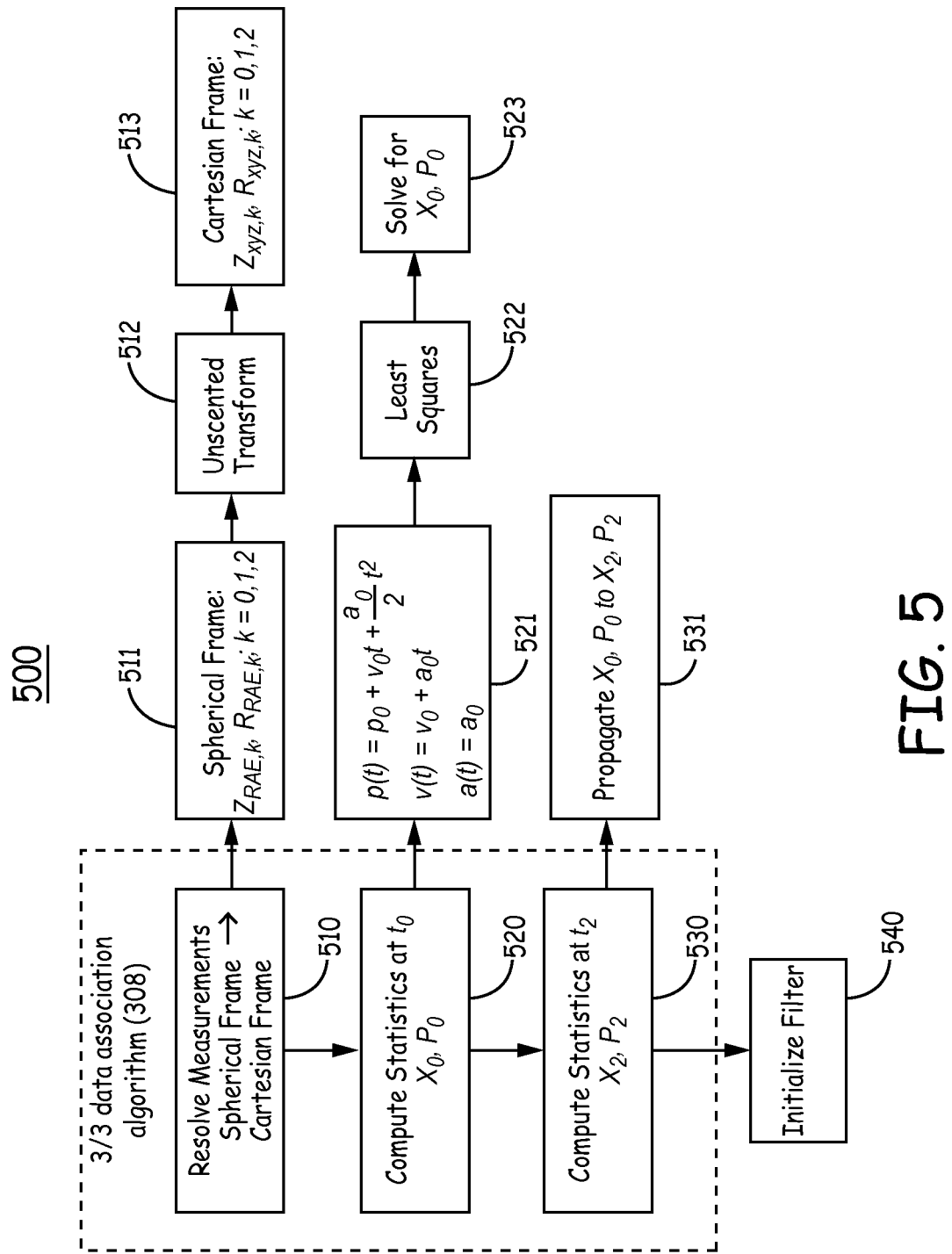
FIG. 5 is an expanded flow diagram of an embodiment of an implementation of a 3/3 measurement-to-measurement data association algorithm.

As shown in FIG. 5, the 3/3 measurement-to-measurement data association algorithm 308 includes three major steps to initialize the filter for tentative tracks. In the first major step of the 3/3 measurement-to-measurement data association algorithm 308 represented generally at 510, the unassigned measurements are resolved from a spherical frame to a Cartesian frame at block 510. The block 510 is shown in an expanded form as block 511 to block 513. Block 511 shows the measurement statistics resolved in the spherical frame. Block 512 shows the unscented transform algorithm. Block 513 shows the measurement statistics resolved in the Cartesian frame. The unscented transform provides a non-linear transformation of the statistics in spherical coordinates of radius (R), elevation (E), and Azimuth (A) to the Cartesian coordinates (x, y, z). This is described mathematically as:

$$Z_{RAE,k}, R_{RAE,k} \rightarrow \text{unscented transform} \rightarrow Z_{xyz,k}, R_{xyz,k}$$

$$R_{xyz,k} = \begin{bmatrix} \text{var}(x_k^2) & \text{var}(x_k, y_k) & \text{var}(x_k, z_k) \\ \text{var}(y_k, x_k) & \text{var}(y_k^2) & \text{var}(y_k, z_k) \\ \text{var}(z_k, x_k) & \text{var}(z_k, y_k) & \text{var}(z_k^2) \end{bmatrix}$$

There are other methods of resolving the unassigned measurements from a spherical frame to a Cartesian frame as is known to one skilled in the art.

In the second major step of the 3/3 measurement-to-measurement data association algorithm 308 represented generally at 520, the state vector statistics are computed at the initial time, $t_0$. Block 520 is shown in an expanded form as blocks 521 to block 523. At block 520, the measurements and their statistics in the Cartesian frame are used in a least squares minimization to determine the state mean vector and state covariance matrix. Block 521 shows the one-dimensional (1D), kinematic relationship between position, velocity, acceleration, initial position, initial velocity, and initial acceleration, which are described mathematically as:

$$p(t) = p_0 + v_0 t + \frac{a_0}{2} t^2$$

$$v(t) = v_0 + a_0 t$$

$$a(t) = a_0$$

where
p(t) position
v(t) velocity
a(t) acceleration
$p_0$≡initial position
$v_0$≡initial velocity
$a_0$≡initial acceleration The acceleration is assumed to be constant during the initialization time frame. The initial state vector statistics are computed as follows. The position equation is rewritten as follows:

$$p(t) = b_0 + b_1 t + b_2 t^2$$

$$b_0 = p_0$$

$$b_1 = v_0$$

$$b_2 = \frac{a_0}{2}$$

The distance between the points $(t_k, m_k)$ $\forall k=1, \ldots n$ is minimized to the quadratic equation p(t), so that:

$$\min_{b_0, b_1, b_2} J = \sum_{k=1}^{n} [m_k - p(t_k)]^2 = \sum_{k=1}^{n} [m_k - (b_0 + b_1 t_k + b_2 t_k^2)]^2.$$

Then critical points are identified from the minimization formulation:

$$\frac{\partial J}{\partial b_0} = 0 = \sum_{k=1}^{n} 2[m_k - (b_0 + b_1 t_k + b_2 t_k^2)](-1)$$

$$\sum_{k=1}^{n} m_k = \left(\sum_{k=1}^{n} 1\right) b_0 + \left(\sum_{k=1}^{n} t_k\right) b_1 + \left(\sum_{k=1}^{n} t_k^2\right) b_2$$

$$\frac{\partial J}{\partial b_1} = 0 = \sum_{k=1}^{n} 2[m_k - (b_0 + b_1 t_k + b_2 t_k^2)](-t_k)$$

$$\sum_{k=1}^{n} m_k t_k = \left(\sum_{k=1}^{n} t_k\right) b_0 + \left(\sum_{k=1}^{n} t_k^2\right) b_1 + \left(\sum_{k=1}^{n} t_k^3\right) b_2$$

$$\frac{\partial J}{\partial b_2} = 0 = \sum_{k=1}^{n} 2[m_k - (b_0 + b_1 t_k + b_2 t_k^2)](-t_k^2)$$

$$\sum_{k=1}^{n} m_i t_i^2 = \left(\sum_{k=1}^{n} t_k^2\right) b_0 + \left(\sum_{k=1}^{n} t_k^3\right) b_1 + \left(\sum_{k=1}^{n} t_k^4\right) b_2$$

The critical points are used to generate an initial state vector solution:

$$\begin{bmatrix} \left(\sum_{k=0}^{n} 1\right) & \left(\sum_{k=0}^{n} t_k\right) & \left(\sum_{k=0}^{n} t_k^2\right) \\ \left(\sum_{k=0}^{n} t_k\right) & \left(\sum_{k=0}^{n} t_k^2\right) & \left(\sum_{k=0}^{n} t_k^3\right) \\ \left(\sum_{k=0}^{n} t_k^2\right) & \left(\sum_{k=0}^{n} t_k^3\right) & \left(\sum_{k=0}^{n} t_k^4\right) \end{bmatrix} \begin{bmatrix} b_0 \\ b_1 \\ b_2 \end{bmatrix} = \begin{bmatrix} \sum_{k=0}^{n} m_k \\ \sum_{k=0}^{n} m_k t_k \\ \sum_{k=0}^{n} m_k t_k^2 \end{bmatrix}$$

$TB = M$ $B = T^{-1} M : 1D$ $T_{XYZ} B_{XYZ} = M_{XYZ} : 3D$ $B_{XYZ} = T_{XYZ}^{-1} M_{XYZ}$ where
$T_{XYZ} = \text{diag}(T, T, T)$
$B_X = [b_{x,0} \; b_{x,1} \; b_{x,2}]^T$
$B_Y = [b_{y,0} \; b_{y,1} \; b_{y,2}]^T$
$B_Z = [b_{z,0} \; b_{z,1} \; b_{z,2}]^T$
$B_{XYZ} = [B_X^T \; B_Y^T \; B_Z^T]^T$
and $$M_X = \left[ \sum_{k=0}^{n} x_k \quad \sum_{k=0}^{n} x_k t_k \quad \sum_{k=0}^{n} x_k t_k^2 \right]^T$$

$$M_Y = \left[ \sum_{k=0}^{n} y_k \quad \sum_{k=0}^{n} y_k t_k \quad \sum_{k=0}^{n} y_k t_k^2 \right]^T$$

$$M_Z = \left[ \sum_{k=0}^{n} z_k \quad \sum_{k=0}^{n} z_k t_k \quad \sum_{k=0}^{n} z_k t_k^2 \right]^T$$

$M_{XYZ} = [M_X^T \; M_Y^T \; M_Z^T]^T$

The mean and covariance are computed for the M vectors. Then, at block 522 a least square analysis is performed to compute the least squares solution:

$Z = H X_0 + V$ $Z = [Z_{xyz,0} \; Z_{xyz,1} \; Z_{xyz,2}]^T$ $$\tilde{H}_k = \begin{bmatrix} 1 & t_k & t_k^2 & 0 & 0 & 0 & 0 & 0 & 0 \\ 0 & 0 & 0 & 1 & t_k & t_k^2 & 0 & 0 & 0 \\ 0 & 0 & 0 & 0 & 0 & 0 & 1 & t_k & t_k^2 \end{bmatrix}$$

$H = [\tilde{H}_0^T \; \tilde{H}_1^T \; \tilde{H}_2^T]^T$ $E\{V\} = 0$ $R = \text{diag}(R_{xyz,0}, R_{xyz,1}, R_{xyz,2})$ $E\{X_0\} = (H^T R^{-1} H)^{-1} H^T R^{-1} Z$ $P_0 = E\{(X_0 - E\{X_0\})(X_0 - E\{X_0\})^T\} = (H^T R^{-1} H)^{-1}$ The last equations $E\{X_0\}=(H^T R^{-1} H)^{-1} H^T R^{-1} Z$ and $P_0 = E\{(X_0 - E\{X_0\})(X_0 - E\{X_0\})^T\} = (H^T R^{-1} H)^{-1}$ are the least squares solution. At block 523, the state vector statistics are computed at the initial time, $X_0$ and $P_0$.

In the third major step of the 3/3 measurement-to-measurement data association algorithm 308 represented generally at 530 computes statistics at time $t_2$. Block 530 is expanded to include block 531. As shown at block 530, state vector statistics are predicted at a second time $t_2$ by propagating the state vector statistics at the initial time $t_0$ to the second time $t_2$.

This 3/3 measurement association advantageously provides more accurate statistics for the initial state vector, reduces the number of tentative tracks formulated from false measurements, and reduces the number of filters initialized for tentative tracks, which reduces computation burden. The filter is initialized when the statistics computed at time $t_2$ are sent from block 308 to block 302.

The methods and techniques described here may be implemented in digital electronic circuitry, or with a processor (for example, a special-purpose processor, a general-purpose processor such as a computer, or a programmable processor), firmware, software, or in combinations of them. Apparatus embodying these techniques may include appropriate input and output devices, a processor, and a storage medium tangibly embodying program instructions for execution by the processor. A process embodying these techniques may be performed by a processor executing a program of instructions to perform desired functions by operating on input data and generating appropriate output. The techniques may advantageously be implemented in one or more programs that are executable on a programmable system including at least one processor coupled to receive data and instructions from, and to transmit data and instructions to, a data storage system, at least one input device, and at least one output device. Generally, a processor will receive instructions and data from a read-only memory and/or a random access memory.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or field programmable gate arrays (FPGA's).

Example Embodiments

Example 1 includes a method to initialize tracks from sensor measurements, the method comprising: identifying at least one tentative track based on data collected from at least one sensor at at least three sequential times at a processor; initializing a confirm/delete track filter for the identified tentative tracks at the processor; and using gates computed from state vector statistics to one of: confirm the at least one tentative track; reprocess the at least one tentative track; or delete the at least one tentative track.

Example 2 includes the method of Example 1, wherein identifying at least one tentative track comprises implementing a 3/3 measurement-to-measurement data association algorithm.

Example 3 includes the method of Example 2, wherein implementing the 3/3 measurement-to-measurement data association algorithm comprises: resolving measurements from a spherical frame to a Cartesian frame; computing state vector statistics at an initial time; computing state vector statistics at a second time; and outputting initial state vector statistics to initialize the confirm/delete track filter for the identified tentative track.

Example 4 includes the method of Example 3, wherein implementing the 3/3 measurement-to-measurement data association algorithm further comprises: identifying measurements at a first time that lie within a spherical gate of unassociated measurements from the initial time, wherein the spherical gate is a spherical region about a measurement vector and a gate threshold is a radius of the spherical region; and identifying measurements at the second time that lie within the spherical gate of associated measurements from the first time.

Example 5 includes the method of any of Examples 3-4, wherein computing state vector statistics at the initial time comprises performing a least squares analysis on a sequence of measurements and statistics associated with the sequence of measurements.

Example 6 includes the method of Example 5, wherein computing state vector statistics at the second time comprises propagating the initial state vector to the second time.

Example 7 includes the method of any of Examples 1-6, wherein using the gates computed from the state vector statistics to confirm the at least one tentative track comprises: predicting state vector statistics at a third time by propagating the state vector statistics at a second time to the third time; implementing ellipsoidal gates to determine if a candidate measurement is associated with a tentative track; and providing a measurement assignment to the tentative track.

Example 8 includes the method of Example 7, further comprising: updating the confirmed tentative tracks; initializing and updating a score for the confirmed tentative track; and implementing a threshold test on the updated confirmed tentative track and track score.

Example 9 includes the method of any of Examples 1-8, wherein using the gates computed from the state vector statistics to delete the at least one tentative track comprises: predicting state vector statistics at a third time by propagating the state vector statistics at a second time to the third time; implementing ellipsoidal gates to determine if a candidate measurement is unassociated with a tentative track; and initializing the confirm/delete track filter for the unassociated candidate measurement to determine if the unassociated candidate measurement is a new track.

Example 10 includes a program product comprising program instructions, embodied on a storage medium, that are operable to cause a processor to: identify at least one tentative track based on data collected from at least one sensor at three sequential times; initialize a confirm/delete track filter for the identified tentative tracks; and use gates computed from state vector statistics to one of confirm the at least one tentative track; reprocess the at least one tentative track; or delete the at least one tentative track.

Example 11 includes the program-product of Example 10, wherein the instructions operable to cause the processor to identify at least one tentative track comprise instructions operable to cause the processor to implement a 3/3 measurement-to-measurement data association algorithm.

Example 12 includes the program-product of Example 11, wherein the instructions operable to cause the processor to implement a 3/3 measurement-to-measurement data association algorithm comprise instructions operable to cause the processor to: resolve measurements from a spherical frame to a Cartesian frame; compute state vector statistics at an initial time; compute state vector statistics at a second time; and output initial state vector statistics to initialize the confirm/delete track filter for the identified tentative track.

Example 13 includes the program-product of Example 12, wherein the instructions operable to cause the processor to implement a 3/3 measurement-to-measurement data association algorithm further comprise instructions operable to cause the processor to: identify measurements at a first time that lie within a spherical gate of unassociated measurements from the initial time; and identify measurements at a second time that lie within the spherical gate of associated measurements from the first time.

Example 14 includes the program-product of any of Examples 12-13, wherein the instructions operable to cause the processor to compute state vector statistics at the initial time comprise instructions operable to cause the processor to compute state vector statistics at the initial time comprises performing a least squares analysis on a sequence of measurements and statistics associated with the sequence of measurements.

Example 15 includes the program-product of Example 14, wherein the instructions operable to cause the processor to compute state vector statistics at the second time comprise instructions operable to cause the processor to propagate the initial state vector to the second time.

Example 16 includes the program-product of any of Examples 10-15, wherein the instructions operable to cause the processor to use the gates computed from the state vector statistics to confirm the at least one tentative track comprise instructions operable to cause the processor to: predict state vector statistics at a third time by propagating the state vector statistics at a second time to the third time; implement ellipsoidal gates to determine if a candidate measurement is associated with a tentative track; initialize a track score for the confirmed tentative track; and provide a measurement assignment to the tentative track, wherein the instructions further comprise instructions operable to cause the processor to: update the confirmed tentative tracks and the track score; and implement a threshold test on the updated confirmed tentative tracks and the track score.

Example 17 includes the program-product of any of Examples 10-16, wherein the instructions operable to cause the processor to use the gates computed from the state vector statistics to delete the at least one tentative track comprise instructions operable to cause the processor to: predict state vector statistics at a third time by propagating the state vector statistics at a second time to the third time; implement ellipsoidal gates to determine if a candidate measurement is unassociated with a tentative track; and initialize the confirm/delete track filter for the unassociated candidate measurement to determine if the unassociated candidate measurement is a new track.

Example 18 includes a vehicle tracking system comprising: a processor communicatively coupled to input data from at least one sensor sensing objects in an environment of a vehicle; and a confirm/delete track filter including at least one algorithm operable to initialize a new track based on input from the at least one sensor.

Example 19 includes the vehicle tracking system of Example 18, wherein the at least one algorithm operable to initialize the new track comprises: a first algorithm to identify at least one tentative track based on data collected from the at least one sensor at three sequential times; a second algorithm to initialize a confirm/delete track filter for the identified tentative tracks; and a third algorithm to use gates computed from state vector statistics to one of: confirm the at least one tentative track; reprocess the at least one tentative track; or delete the at least one tentative track.

Example 20 includes the vehicle tracking system of any of Examples 18-19, further comprising: the at least one sensor.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method to initialize tracks from sensor measurements, the method comprising:
   identifying, at a processor, at least one tentative track by implementing a 3/3 measurement-to-measurement data association algorithm based on data collected from at least one sensor at at least three sequential times, wherein the implementing the 3/3 measurement-to-measurement data association algorithm comprises:
      resolving measurements from a spherical frame to a Cartesian frame;
      computing state vector statistics at an initial time;
      computing state vector statistics at a second time; and
      outputting initial state vector statistics to initialize the confirm/delete track filter for the identified tentative track;
      identifying measurements at a first time that lie within a spherical gate of unassociated measurements from the initial time, wherein the spherical gate is a spherical region about a measurement vector and a gate threshold is a radius of the spherical region; and
      identifying measurements at the second time that lie within the spherical gate of associated measurements from the first time,
   the method further comprising:
   initializing a confirm/delete track filter for the identified tentative tracks; and
   using ellipsoidal gates computed from the state vector statistics to one of: confirm the at least one tentative track; reprocess the at least one tentative track; or delete the at least one tentative track.

2. The method of claim 1, wherein implementing the 3/3 measurement-to-measurement data association algorithm further comprises:
   identifying measurements at a first time that lie within a spherical gate of unassociated measurements from the initial time; and
   identifying measurements at the second time that lie within the spherical gate of associated measurements from the first time.

3. The method of claim 1, wherein computing the state vector statistics at the initial time comprises performing a least squares analysis on a sequence of measurements and statistics associated with the sequence of measurements.

4. The method of claim 3, wherein computing the state vector statistics at the second time comprises propagating the initial state vector to the second time.

5. The method of claim 1, wherein using the ellipsoidal gates computed from the state vector statistics to confirm the at least one tentative track comprises:
   predicting state vector statistics at a third time by propagating the state vector statistics at a second time to the third time;
   implementing the ellipsoidal gates to determine if a candidate measurement is associated with a tentative track; and
   providing a measurement assignment to the tentative track.

6. The method of claim 5, further comprising:
   updating confirmed tentative tracks;
   initializing and updating a score for the confirmed tentative track; and
   implementing a threshold test on the updated confirmed tentative track and a track score.

7. The method of claim 1, wherein using the ellipsoidal gates computed from the state vector statistics to delete the at least one tentative track comprises:
   predicting state vector statistics at a third time by propagating the state vector statistics at a second time to the third time;
   implementing the ellipsoidal gates to determine if a candidate measurement is unassociated with a tentative track; and
   initializing the confirm/delete track filter for the unassociated candidate measurement to determine if the unassociated candidate measurement is a new track.

8. A non-transitory program product comprising program instructions, embodied on a storage medium, that are operable to cause a processor to: identify at least one tentative track by implementing a 3/3 measurement-to-measurement data association algorithm based on data collected from at least one sensor at three sequential times, wherein the implementing the 3/3 measurement-to-measurement data association algorithm comprises program instructions, embodied on the storage medium, that are operable to cause the processor to:
   resolve measurements from a spherical frame to a Cartesian frame;
   compute state vector statistics at an initial time;
   compute state vector statistics at a second time; and
   output initial state vector statistics to initialize the confirm/delete track filter for the identified tentative track;
   identify measurements at a first time that lie within a spherical gate of unassociated measurements from the initial time, wherein the spherical gate is a spherical region about a measurement vector and a gate threshold is a radius of the spherical region; and
   identify measurements at the second time that lie within the spherical gate of associated measurements from the first time;
   wherein the program instructions, embodied on the storage medium, are further operable to cause the processor to:
   initialize a confirm/delete track filter for the identified tentative tracks; and
   use gates computed from the state vector statistics to one of confirm the at least one tentative track; reprocess the at least one tentative track; or delete the at least one tentative track.

9. The non-transitory program-product of claim 8, wherein the instructions operable to cause the processor to implement a 3/3 measurement-to-measurement data association algorithm further comprise instructions operable to cause the processor to:
   identify measurements at a first time that lie within a spherical gate of unassociated measurements from the initial time; and
   identify measurements at a second time that lie within the spherical gate of associated measurements from the first time.

10. The non-transitory program-product of claim 8, wherein the instructions operable to cause the processor to compute the state vector statistics at the initial time comprise:

perform a least squares analysis on a sequence of measurements and statistics associated with the sequence of measurements.

11. The non-transitory program-product of claim 10, wherein the instructions operable to cause the processor to compute the state vector statistics at the second time comprise instructions operable to cause the processor to propagate the initial state vector to the second time.

12. The non-transitory program-product of claim 8, wherein the instructions operable to cause the processor to use the gates computed from the state vector statistics to confirm the at least one tentative track comprise instructions operable to cause the processor to:
predict state vector statistics at a third time by propagating the state vector statistics at a second time to the third time;
implement ellipsoidal gates to determine if a candidate measurement is associated with a tentative track;
initialize a track score for a confirmed tentative track; and
provide a measurement assignment to the tentative track, wherein the instructions further comprise instructions operable to cause the processor to:
update confirmed tentative tracks and the track score; and
implement a threshold test on the updated confirmed tentative tracks and the track score.

13. The non-transitory program-product of claim 8, wherein the instructions operable to cause the processor to use the gates computed from the state vector statistics to delete the at least one tentative track comprise instructions operable to cause the processor to:
predict state vector statistics at a third time by propagating the state vector statistics at a second time to the third time;
implement ellipsoidal gates to determine if a candidate measurement is unassociated with a tentative track; and
initialize the confirm/delete track filter for the unassociated candidate measurement to determine if the unassociated candidate measurement is a new track.

14. A vehicle tracking system comprising:
a processor communicatively coupled to input data from at least one sensor sensing objects in an environment of a vehicle; and
a confirm/delete track filter including at least one algorithm operable to initialize a new track based on input from the at least one sensor, wherein the at least one algorithm operable to initialize the new track comprises:
a first algorithm to identify at least one tentative track based on data collected from the at least one sensor at three sequential times by:
resolving measurements from a spherical frame to a Cartesian frame;
computing state vector statistics at an initial time;
computing state vector statistics at a second time; and
outputting initial state vector statistics to initialize the confirm/delete track filter for the identified tentative track;
identifying measurements at a first time that lie within a spherical gate of unassociated measurements from the initial time, wherein the spherical gate is a spherical region about a measurement vector and a gate threshold is a radius of the spherical region; and
identifying measurements at the second time that lie within the spherical gate of associated measurements from the first time;
a second algorithm to initialize a confirm/delete track filter for the identified tentative tracks; and
a third algorithm to use ellipsoidal gates computed from the state vector statistics to one of: confirm the at least one tentative track; reprocess the at least one tentative track; or delete the at least one tentative track.

15. The vehicle tracking system of claim 14, further comprising: the at least one sensor.

* * * * *